(12) United States Patent
Lee et al.

(10) Patent No.: US 6,904,018 B2
(45) Date of Patent: Jun. 7, 2005

(54) METHOD FOR HIGH SPEED REROUTING IN MULTI PROTOCOL LABEL SWITCHING NETWORK

(75) Inventors: Jae Yong Lee, Daejeon-shi (KR); Byung Chul Kim, Daejeon-shi (KR); Kyoung Kuen Lee, Daejeon-shi (KR); Yi Han Kim, Daejeon-shi (KR); Young Do Joo, Daejeon-shi (KR)

(73) Assignee: Korea Telecommunication Authority, Kyunggi-do (JP)

( * ) Notice: Subject to any disclaimer, the term of this patent is extended or adjusted under 35 U.S.C. 154(b) by 785 days.

(21) Appl. No.: 09/736,078

(22) Filed: Dec. 13, 2000

(65) Prior Publication Data
US 2002/0060985 A1 May 23, 2002

(30) Foreign Application Priority Data
Nov. 22, 2000 (KR) ........................................ 2000-69456

(51) Int. Cl.[7] .............................................. H04L 12/26
(52) U.S. Cl. ........................ 370/238; 370/216; 370/256
(58) Field of Search ................................ 370/216, 228, 370/238, 256, 237, 225, 227

(56) References Cited

U.S. PATENT DOCUMENTS

| | | | | |
|---|---|---|---|---|
| 5,442,623 A | * | 8/1995 | Wu | ............................ 370/224 |
| 6,363,319 B1 | * | 3/2002 | Hsu | ............................ 701/202 |
| 6,530,032 B1 | * | 3/2003 | Shew et al. | .................... 714/4 |
| 6,538,991 B1 | * | 3/2003 | Kodialam et al. | .......... 370/229 |
| 2002/0181485 A1 | * | 12/2002 | Cao et al. | ................... 370/419 |

OTHER PUBLICATIONS

Huang et al, "A Path Protection/Restoration Mechanism for MPLS Networks", IEFT Draft, Mar., 2000, www.water-springs.org.*

* cited by examiner

*Primary Examiner*—Afsar Qureshi
(74) *Attorney, Agent, or Firm*—Merchant & Gould P.C.

(57) ABSTRACT

Disclosed is a method for high speed rerouting in a multi protocol label switching (MPLS) network which can minimize a packet loss and enable a fast rerouting of traffic so as to protect and recover a multi point to point LSP occupying most LSPs in the MPLS network. The method for high speed rerouting in a multi protocol label switching (MPLS) network, the method comprising the steps of controlling a traffic stream to flow in a reverse direction in a point where a node or link failure occurs by using a backup Label Switched Path (LSP) comprising an Explicitly Routed (ER) LSP having a reverse tree of a protected multi point to point LSP and an ingress LSR through an egress LSR.

3 Claims, 5 Drawing Sheets

→ Protected point-to-point LSP
→ Backup LSP
---→ Traffic flow after failure

METHOD FOR HIGH SPEED REROUTING IN MULTI PROTOCOL LABEL SWITCHING NETWORK

BACKGROUND OF THE INVENTION

1. Field of the Invention

The present invention relates to a method for high speed rerouting in a multi protocol label switching network (MPLS), and in particular to a method for high speed rerouting in a MPLS switching network, which quickly deals with a failure in a node or a link comprising a multipoint-to-point label switched path (LSP) installed in Internet introducing the MPLS.

2. Description of the Related Art

Accompanying with tremendous popularity and traffic, Internet transfers real time traffic, priority traffic and an important business data, thereby rendering survivability of a communication network more important.

Among the related methods, a MPLS is characterized by setting a label switched path (hereinafter referred to as LSP) between terminals based on a routing information, and sticking a label of a specific length to a packet entered through an ingress label switching router (hereinafter referred to as LSR) according to its destination address and transferring the packet to the destination. Then, an intermediate LSR searches a label table from an input label of each packet and transfers the corresponding output level to the corresponding output link by swapping the corresponding output label with a new label.

As described above, the multi protocol label switching (hereinafter referred to as MPLS) method initially has been standardized for a main purpose of high speed transfer of the packet via the label swapping. However, the application of the method has been extended to a fast protection/recovery, a virtual private network, etc.

Among the applications of the MPLS method, a framework related to a MPLS path protection/recovery was suggested in "Framework for MPLS-based Recovery" by S. Makam, et al. dated July 2000.

As well known, the most important requirement in a recovery mechanism against various types of node or link failures generated in Internet is a fast setting of a substitute path and a fast routing of a traffic to the substitute path in order to minimize a packet loss. The fast rerouting path setting method for a point-to-point LSP in the MPLS network was suggested in "A Method for Setting an Alternative Label Switched Paths to Handle Fast Reroute" by D. Haskin and R. Krishnan dated May 2000. The main concept of the method is that when there generates a failure in a node or a link in the point to point LSP, a traffic transferred to a corresponding LSP is returned to a traffic source, which in turn transfers the traffic through an explicitly routed LSP (hereinafter referred to as ER-LSP) pre-set between the traffic source and a destination. Thus, the method has an advantage of minimizing the packet loss and high speed rerouting the traffic although the failure occurs in any point of the point-to-point LSP.

FIG. 1 is a diagram illustrating a process of protecting a point-to-point LSP in the fast rerouting path setting method in the MPLS network according to the conventional art.

First, an arrow marked with a thin line in FIG. 1 signifies a protected point-to-point LSP, an arrow marked with a thick line signifies a backup LSP, and an arrow marked with a dotted line signifies a traffic flow after a failure.

Referring to FIG. 1, when a failure occurs between a LSR5 and a LSR7, a traffic stream is loop-backed in the LSR5 to be sent to a source node (ingress LSR1) as marked with the dotted line, which in turn transfers the traffic stream to an ER-LSP (LSR1?LSR2?LSR4?LSR6?LSR7) set between a source LSR and a destination LSR, namely a LSR1 and a LSR7 so as not to overlap the protected LSP each other, thereby minimizing the packet loss and protecting the point-to-point LSP.

However, the point-to-point LSP protection method devised by Haskin has not suggested a process of protecting a multipoint-to-point LSP.

In other words, the LSR performs a label merging function, through which one multipoint-to-point LSP can be generated in most cases with respect to one FEC in the MPLS domain, with the exception of some cases including an ATM LSR, which does not support the merging.

Such point-to-point LSP protection method was suggested in "A Path Protectional/Restoration Mechanism for MPLS Networks" by C. Huang, et al. The method is characterized by transferring a fault indication signal (FIS) through a reverse tree of the LSP to notify the failure to a path switching LSR (PSL) of an upstream, if a failure occurs in a link or a node of the multipoint-to-point LSP. Here, the label merging LSR transfers the FIS in the upward direction. The PSL receiving the FIS transfers the corresponding traffic stream through the backup LSP to a path merging LSP (PML) in order to deal with a failure in a LSP of a downstream.

FIG. 2 is a diagram illustrating the multipoint-to-point LSP protection method suggested by C. Huang. An arrow marked with a thin line in FIG. 2 signifies the protected multipoint-to-point LSP between the PSL and the PML, and an arrow marked with a dotted line signifies the traffic flow after the FIS notification.

Referring to FIG. 2, when a failure occurs in a link between the LSR4 and the LSR6, the LSR4 senses the failure and transfers the FIS to the LSR3. The label merging LSR3 receiving the FIS transfers the FIS in the link between the LSR2 and the LSR9. Then, the final PSL (LSR1, LSR9) receiving the FIS switches the corresponding traffic stream to the backup LSP (LSR1?LSR5?LSR11?LSR6?LSR7, LSR9?LSR10?LSR7) to perform the multipoint-to-point LSP protection.

However, in the above process from sensing the failure to transferring the FIS up to the PSL, a volume of packet loss possibly occurs. In addition, if the PSL is not the ingress LSR, the LSP between the ingress LSR and the PSL cannot be protected.

Therefore, a more efficient mechanism for the multipoint-to-point LSP protection and recovery is under need.

SUMMARY OF THE INVENTION

It is, therefore, an object of the present invention to provide a method for high speed rerouting in a MPLS network, which can minimize a packet loss and enable a fast rerouting of a traffic so as to protect and recover a multipoint-to-point LSP occupying most LSPs in the MPLS network.

To achieve the above object, there is provided a method for high speed rerouting in a multi protocol label switching (MPLS) network, the method comprising the steps of controlling a traffic stream to flow in a reverse direction in a point where node or link failure occurs by using a backup Label Switched Path (LSP) comprising an Explicitly Routed (ER) LSP having a reverse tree of a protected multipoint-to-point LSP and an ingress LSR through an egress LSR.

Also, there is provided a method for high speed rerouting in a multi protocol label switching (MPLS) network, comprising the steps of setting a backup Label Switched Path (LSP) comprising a point-to-multipoint reverse anycast tree reaching an ingress Labsel Switching Router (LSR) with an egress LSR of a multipoint-to-point LSP performing as a root; and transferring, at a LSR sensed a failure, a traffic stream through the reverse anycast tree by loop-backing the traffic stream in a reverse direction, when the failure occurs in one link in the MPLS network.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

First, a backup LSP is pre-set to perform a fast rerouting of a multipoint-to-point LSP in a MPLS network according to the present invention. That is to say, the backup LSP is pre-established to minimize a packet loss in case of a failure.

Here, the backup LSP comprises two path segments. A first path segment includes a multipoint-to-point reverse anycast tree reaching an ingress LSR in a reversely upward direction along a link of a multipoint-to-point LSP with an egress LSR of the protected multipoint-to-point LSP as a root. A second path segment of the backup LSP is an ER-LSP occupying from the ingress LSR to an egress LSR without containing the link of the protected multipoint-to-point LSP.

Figure 3:
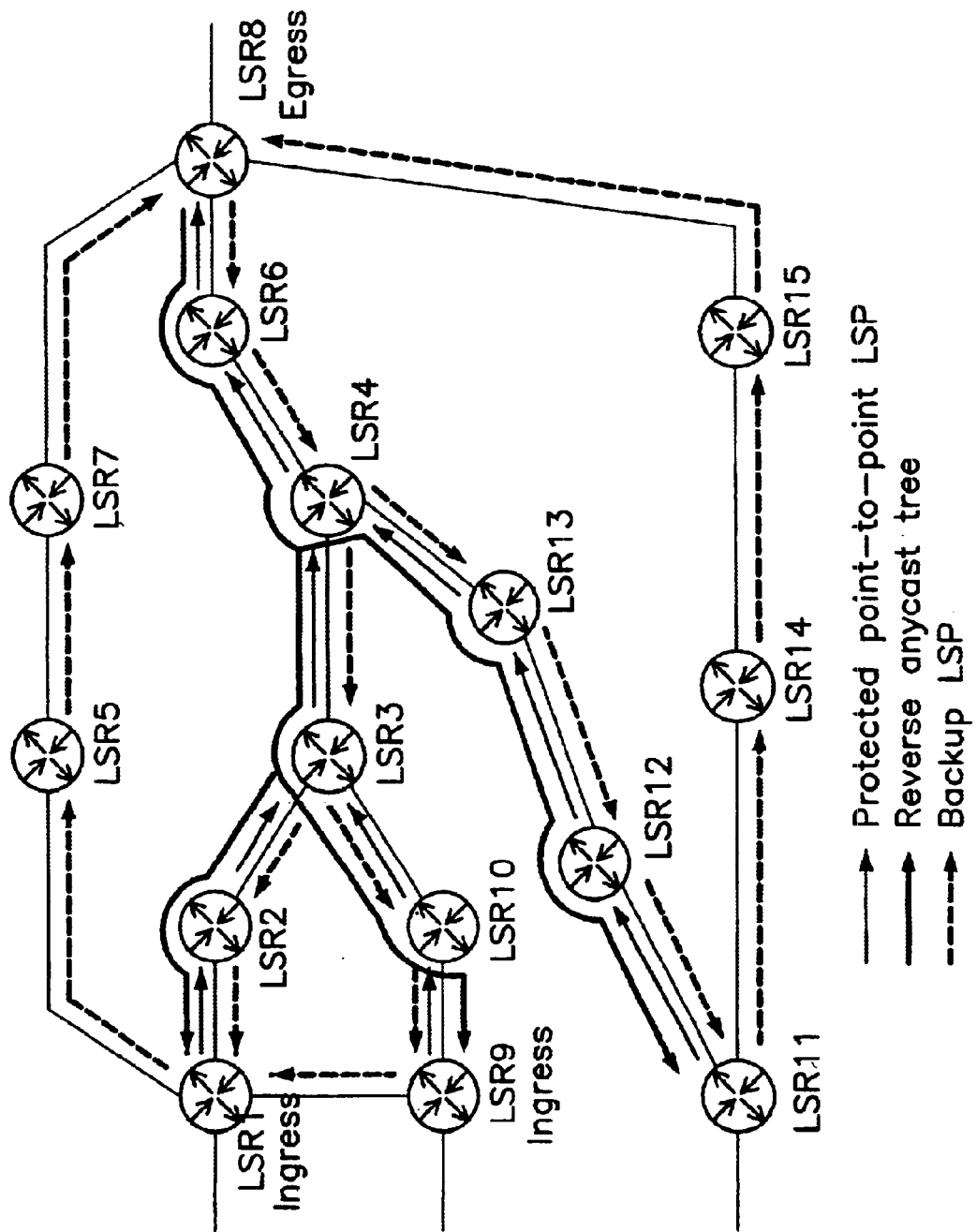
FIG. 3 is a diagram illustrating a protected multipoint-to-point LSP and a backup LSP according to the present invention.

FIG. 3 is a diagram illustrating the protected multipoint-to-point LSP and the backup LSP in the MPLS network. A packet transferred to the anycast tree in FIG. 3 is transferred to only one side in a break point, in contrast to a packet transferred to a multicast tree so that the packet transferred by the root is transferred to one point of several leaf nodes.

Figure 4:
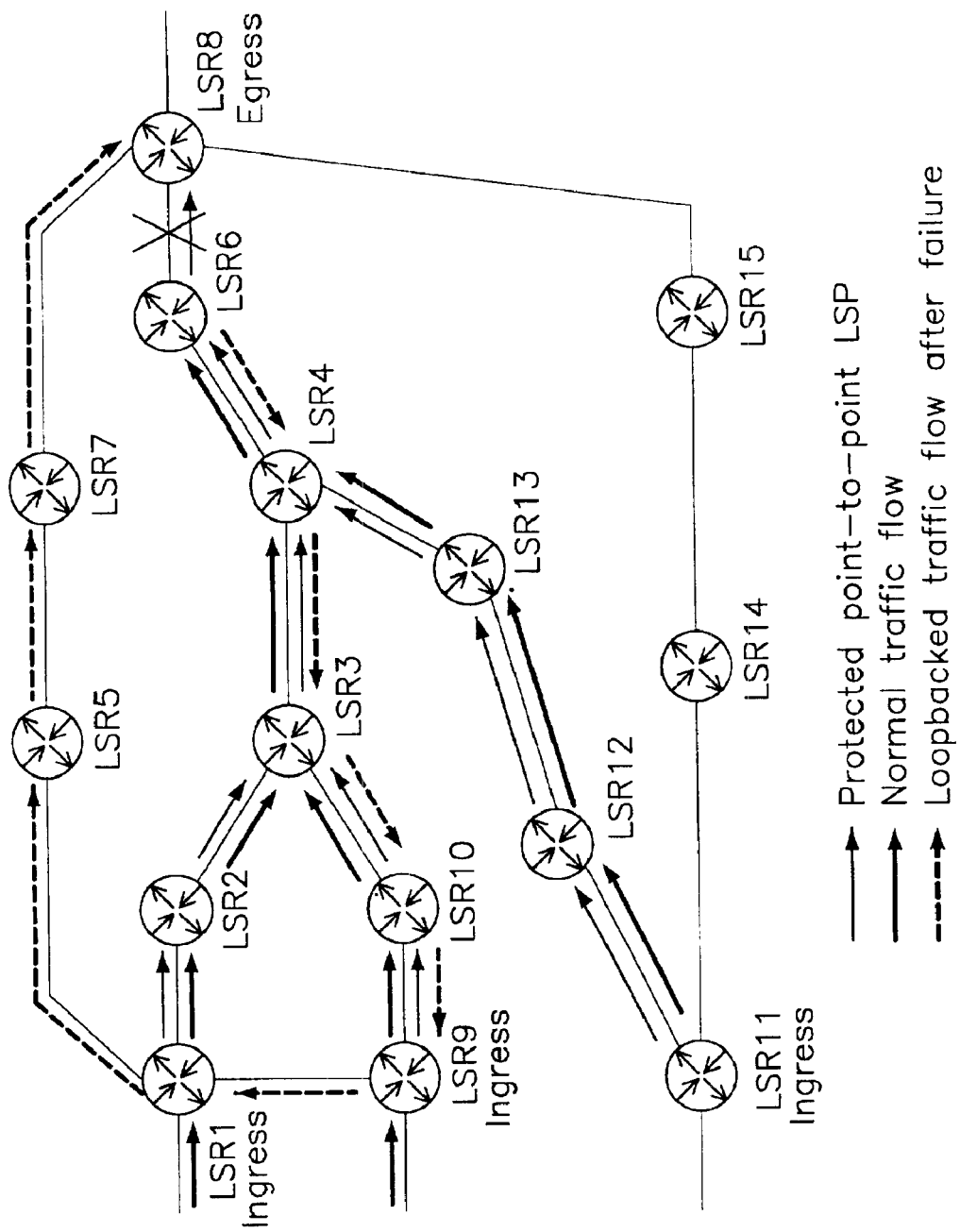
FIG. 4 is a diagram illustrating a process of high speed rerouting a traffic when there generates a failure in one link in a MPLS network in FIG. 3.

FIG. 4 is a diagram illustrating a process of high speed rerouting in the MPLS network as shown in FIG. 3 when there generates a failure in one link in the MPLS network. Referring to FIG. 4, a LSR6 sensing the failure occurring in a link between a LSR6 and a LSR8 loop-backs a traffic stream in a reverse direction so as to make the same to flow along the reverse anycast tree.

Thereafter, a merging LSR, such as a LSR4 or a LSR3 receiving the loop-backed traffic stream transfers the same to only one side link of an upstream. Here, the link selection is realized in several ways. A load balancing way is used to uniformly disperse the traffic. There is also a way to transfer the traffic by giving a priority to a specific link.

FIG. 4 is a diagram illustrating a process of transferring the loop-backed traffic, wherein the merging LSR4 gives a priority to a link between the LSR4 and the LSR3, and the merging LSR3 gives a priority to a link between a LSR3 and a LSR10.

To be specific, referring to FIG. 4, when a failure occurs in a link between the LSR6 and the LSR8, the LSR6 loop-backs the traffic stream in the reverse direction so as to make the same to flow along the reverse anycast tree. The merging LSR4 receiving the loop-backed packet selects the link LSR4-LSR3 based on the priority, and further the merging LSR3 transfers the loop-backed traffic through the link LSR3-LSR10 based on the priority.

In the meantime, the fast rerouting method for the multipoint-to-point LSP protection has a disadvantage that the loop-backed traffic fails to accurately seek its transfer path and ends to miss when there simultaneously generate multi failures in the plurality links.

Figure 5:
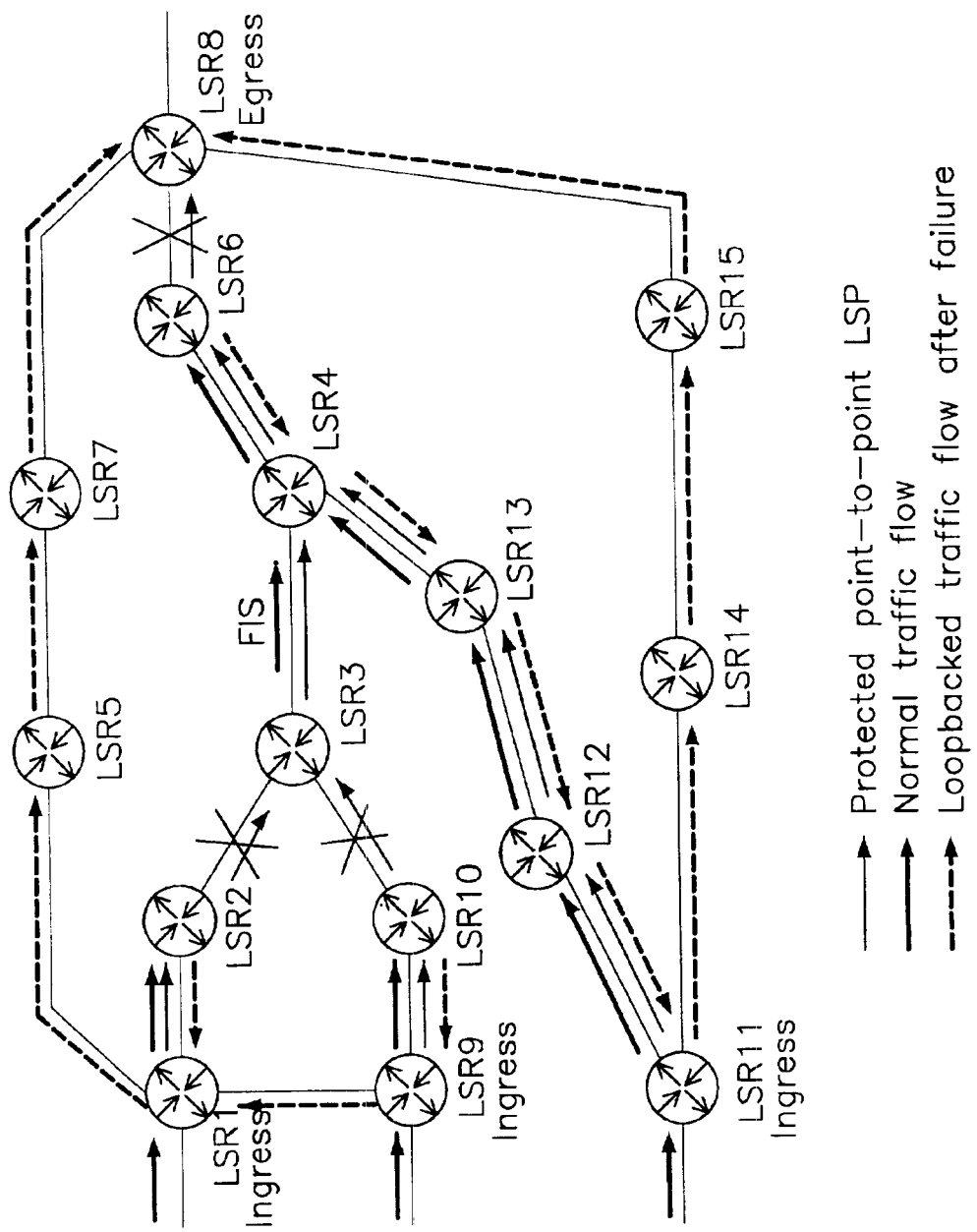
FIG. 5 is a diagram illustrating a process of high speed rerouting a traffic when there generate failures in a plurality of links in the MPLS network in FIG. 3.

FIG. 5 is a diagram illustrating a process of high speed rerouting the traffic when failures occur in the plurality of links, in contrast to that in FIG. 4.

To be specific, when multi failures occur not only in the link between the LSR6 to the LSR8 but also in the link in the LSR2-LSR3 and LSR10-LSR3, the traffic of the ingress LSR1 is loop-backed to be recovered, and the traffic of the ingress LSR9 is loop-backed in the LSR10 to be recovered. However, the traffic entering the ingress LSR11 is transferred to the LSR6 to be loop-backed in the LSR2, subsequently through the LSR4 up to the LSR3. Here, the links of the upstream, namely the LSR3-LSR2 and the LSR3-LSR10, all suffering the failure, results in losing all the packets.

Thus, a control message is needed to make the fast rerouting for the multipoint-to-point LSP to perform a normal operation as described in FIG. 4. The LSR3 sensing that all the links, viz, the LSR2-LSR3, and LSR10-LSR3 are suffering the failure transfers the FIS message in a downward direction as shown in FIG. 5. The LSR4 receiving the FIS transfers the loop-backed message toward the LSR13, so as to perform the fast rerouting in the plurality of links.

Figure 1:
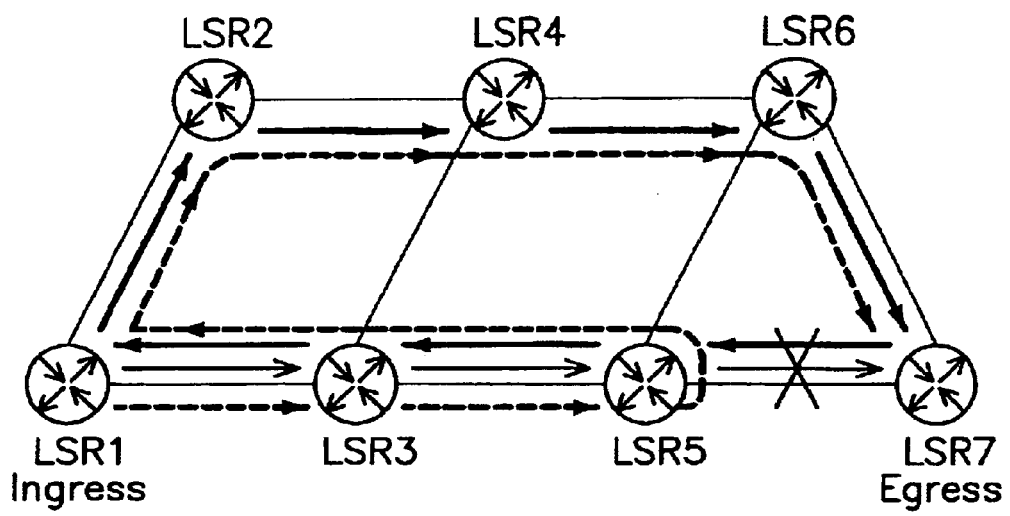
FIG. 1 is a diagram illustrating a process of setting a backup LSP and high speed rerouting for a point-to-point LSP protection according to the conventional art.
Figure 2:
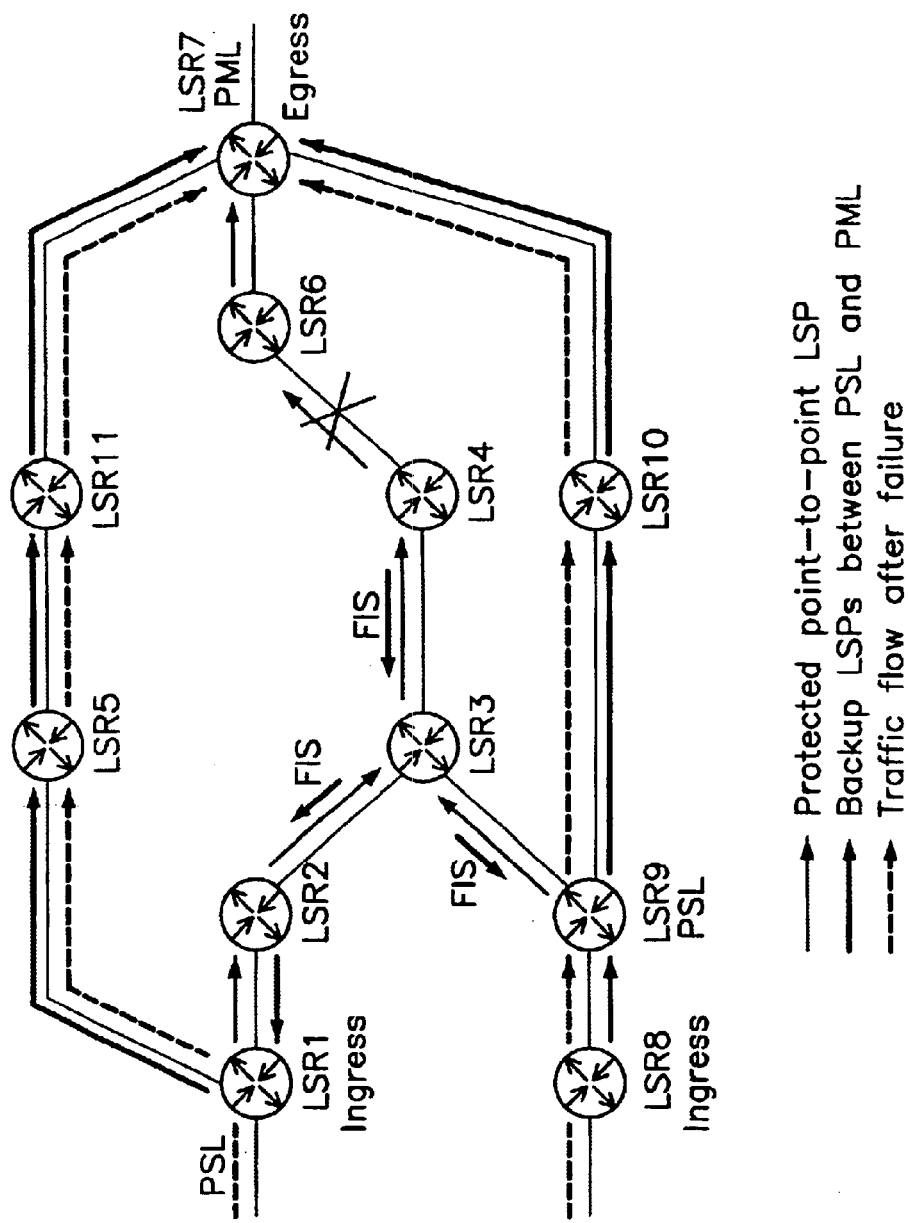
FIG. 2 is a diagram illustrating a process of protecting a multipoint-to-point LSP according to the conventional art.

Here, the FIS message transferred in the downward direction from the LSR3 is used to indicate that a transfer route does not exist toward the traffic source, namely the ingress LSR, in contrast to FIG. 2. As a result, the fast rerouting of the traffic is able to be realized even if there generate failures in the plurality of links.

As stated above, the present invention has advantages of enabling the fast rerouting of the traffic and minimizing the packet loss for the multipoint-to-point LSP protection and recovery, accordingly improving the reliability on the MPLS network.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for high speed rerouting in a multi protocol label switching (MPLS) network, comprising the steps of:

setting a backup Label Switched Path (LSP) comprising a point-to-multipoint reverse anycast tree reaching an ingress Label Switching Router (LSR) with an egress LSR of a multipoint-to-point LSP performing as a root; and transferring, at a LSR sensed a failure, a traffic stream through the reverse anycast tree by looping back the traffic stream in a reverse direction, when the failure occurs in one link in the MPLS network.

2. The method of claim 1, the traffic stream transferring step comprising the step of transferring a loop-backed packet based on a priority predetermined in each link, when the loop-backed packet reaches to a merging LSR of an upstream having a plurality of links.

3. The method of claim 1, the traffic stream transferring step comprising the steps of:

generating, at the LSR sensed the multi failure, a fault indication signal (FIS) message representing that a transfer route does not exist and transferring the message to a LSR of a downstream when the multi failures are occurred in a plurality of links comprising in the MPLS network;

transferring, at the LSR of the downstream, the loop-backed traffic to the reverse anycast tree not suffering the multi failures based on the FIS message.

* * * * *